(12) United States Patent
Verger et al.

(10) Patent No.: US 9,332,584 B2
(45) Date of Patent: May 3, 2016

(54) DISCONTINUOUS RECEPTION CYCLE SCALING IN A WIRELESS DEVICE

(71) Applicant: Apple Inc., Cupertino, CA (US)

(72) Inventors: Luciano M Verger, Santa Clara, CA (US); Navid Damji, Cupertino, CA (US); Zhu Ji, San Jose, CA (US)

(73) Assignee: Apple Inc., Cupertino, CA (US)

( * ) Notice: Subject to any disclaimer, the term of this patent is extended or adjusted under 35 U.S.C. 154(b) by 66 days.

(21) Appl. No.: 13/654,522

(22) Filed: Oct. 18, 2012

(65) Prior Publication Data

US 2014/0112221 A1 Apr. 24, 2014

(51) Int. Cl.
*H04W 76/04* (2009.01)
*H04W 52/02* (2009.01)

(52) U.S. Cl.
CPC ........ *H04W 76/048* (2013.01); *H04W 52/0216* (2013.01); *H04W 52/0232* (2013.01); *H04W 52/0251* (2013.01); *H04W 52/0277* (2013.01); *Y02B 60/50* (2013.01)

(58) Field of Classification Search
CPC ..... H04W 52/02; H04W 24/10; H04W 68/00; H04W 24/00; H04W 36/34; H04W 24/02; H04L 12/26; H04B 1/00; H04B 17/00
USPC ...................... 370/311, 252, 241, 238, 230.1; 455/434, 436, 458, 69, 423, 418; 375/226
See application file for complete search history.

(56) References Cited

U.S. PATENT DOCUMENTS 7,689,196 B2 3/2010 Hutchinson et al.
8,243,639 B2 8/2012 Fonseca, Jr. et al.
2008/0085680 A1* 4/2008 Kim et al. .................. 455/69
2009/0310503 A1 12/2009 Tenny et al.
2011/0075558 A1* 3/2011 Isaksson et al. .......... 370/230.1
2011/0183663 A1* 7/2011 Kenehan et al. ............ 455/423

(Continued)

FOREIGN PATENT DOCUMENTS

EP         1903814        9/2007
WO       2007149732      12/2007
WO    WO 2013149666 A1 * 10/2013

OTHER PUBLICATIONS

International Search Report and Written Opinion from PCT/US2013/064480, mailed Jan. 28, 2014, Apple Inc., pp. 1-12.

(Continued)

*Primary Examiner* — Charles C Jiang
*Assistant Examiner* — Wali Butt
(74) *Attorney, Agent, or Firm* — Meyertons Hood Kivlin Kowert & Goetzel, P.C.; Jeffrey C. Hood

(57) ABSTRACT

Connected-mode discontinuous reception (C-DRX) cycle scaling by a wireless user equipment (UE) device. The UE may establish a connection with a network via a wireless link, which may operate according to LTE. The UE may communicate with the network via the wireless link using C-DRX over a plurality of C-DRX cycles. Each C-DRX cycle may include a period of time during which the UE operates in a reduced-power state and a scheduled on-duration period of time. An indication may be received to remain in the reduced-power state during the scheduled on-duration period of time of at least one C-DRX cycle. The UE may remain in the reduced-power state during the scheduled on-duration period of time of at least one C-DRX cycle in response to the indication.

21 Claims, 14 Drawing Sheets

(56) References Cited

U.S. PATENT DOCUMENTS

| | | |
|---|---|---|
| 2011/0199910 A1 | 8/2011 | Oh et al. |
| 2011/0299421 A1 | 12/2011 | Werb et al. |
| 2012/0071177 A1* | 3/2012 | Hung et al. .................. 455/458 |
| 2012/0236920 A1* | 9/2012 | Ben-Eli ......................... 375/226 |
| 2013/0194991 A1* | 8/2013 | Vannithamby et al. ....... 370/311 |
| 2013/0223307 A1* | 8/2013 | Ohlsson et al. ............... 370/311 |
| 2014/0036748 A1* | 2/2014 | Mukherjee et al. ........... 370/311 |

OTHER PUBLICATIONS

Ericsson, "Introduction of Carrier Aggregation", Nov. 8, 2010, pp. 1-52.
Office Action from Taiwanese Application No. 102137819, issued Feb. 17, 2015, Chinese version, pp. 1-9.
International Preliminary Report on Patentability from PCT/US2013/064480, issued Apr. 30, 2015, Apple Inc., pp. 1-8.

* cited by examiner

DISCONTINUOUS RECEPTION CYCLE SCALING IN A WIRELESS DEVICE

FIELD

The present subject matter relates to wireless devices, and more particularly to a system and method for a wireless device to scale back observation of discontinuous reception (DRX) cycles for increased power savings.

DESCRIPTION OF THE RELATED ART

Wireless communication systems are rapidly growing in usage. Further, wireless communication technology has evolved from voice-only communications to also include the transmission of data, such as Internet and multimedia content. Many wireless communication technologies, such as cellular communication technologies, are substantially designed to provide mobile communication capabilities to wireless devices, such as cellular phones. Accordingly, wireless devices are generally powered by a portable power supply, e.g., a battery.

Batteries hold a finite charge, and so in order to improve battery life of wireless devices, one approach is to reduce power consumption required to perform wireless communications. Accordingly, some wireless communication technologies implement features designed to conserve power while still providing a high-quality user experience. One example of such a feature is the capability to operate in a connected-mode with discontinuous reception (C-DRX) in LTE.

In C-DRX according to LTE, a wireless device may monitor the physical downlink control channel (PDCCH) at specific intervals, and enter a reduced-power state between those intervals if a sufficient period of inactivity is observed. The device may subsequently periodically "wake up" for brief periods of time to check whether any uplink or downlink data is pending in between longer periods of time in the reduced-power state.

While this may conserve power in the wireless device, the actual amount of power savings are generally tied to the relative lengths of the inactive and active portions of the C-DRX cycle. In other words, the longer the inactive portion of the cycle, compared to the active portion of the cycle, the greater the power savings may be. In practice, C-DRX cycle length, including the relative lengths of the active and inactive portions of the C-DRX cycle, may commonly be a parameter determined by the operator of the LTE network. It may further be common that the C-DRX cycle length may be uniformly implemented for all devices operating in a given network. In this case, there may be no provision for different conditions in which different C-DRX cycle lengths would be preferable.

However, wireless devices may experience a variety of conditions, and may support a variety of applications, for which the balance between desirability of long battery life and superior performance may differ. For example, under very low battery or extreme thermal conditions, the default C-DRX behavior according to network configuration may not provide sufficient battery conservation or thermal mitigation. As another example, for different types of applications (e.g., having certain traffic patterns or quality of service requirements) which may use a device's wireless communication capability, different amounts of communication delay may be considered acceptable in order to provide a good user experience. A C-DRX configuration which is uniformly applied by the network may not account for such variations on the device side. Accordingly, improvements in wireless communications would be desirable.

SUMMARY

In light of the foregoing and other concerns, it would be desirable to provide a way for wireless devices to modify their operation in C-DRX mode, in particular on an individual basis in response to conditions present at the individual wireless devices. In particular, it may be desirable to enable a wireless device to scale down its observation of network configured wakeup times in C-DRX operation. The scaling factor used (if any) could depend on the particular conditions being experienced by the wireless device, in order to optimize the balance between power savings (e.g., battery conservation) and device performance (e.g., low-latency communication).

For example, it may be desirable to scale back C-DRX cycle observation for certain types of traffic types and/or patterns, such as traffic for which no or low Quality of Service (QoS) requirements exist or for which slightly higher latency/response time may not significantly affect user experience, such as some web browsers/web queries. In contrast, it may be preferable not to scale back C-DRX cycle observation for applications or services with high QoS requirements or for which low latency/response time is required for a good user experience, such as some bi-directional multimedia and/or interactive applications (e.g., video-chat applications, real-time interactive games, etc). Alternatively, or in addition, it may be desirable to scale back C-DRX cycle observation if certain ill-conditions are observed, which may be mitigated by skipping some scheduled periods of activity, such as low battery life or thermal escalation.

Accordingly, embodiments are presented herein of a method for a wireless user equipment (UE) device to perform C-DRX cycle scaling, and a UE configured to implement the method. The UE may include one or more radios, including one or more antennas, for performing wireless communications with base stations (BSs). The UE may also include device logic (which may include a processor and memory medium and/or hardware logic) configured to implement the method. Embodiments are also presented of a memory medium (e.g., a non-transitory computer accessible memory medium) storing program instructions executable by a processor to perform part or all of the method.

BRIEF DESCRIPTION OF THE DRAWINGS

A better understanding of the present subject matter can be obtained when the following detailed description is considered in conjunction with the following drawings.

Figure 1:
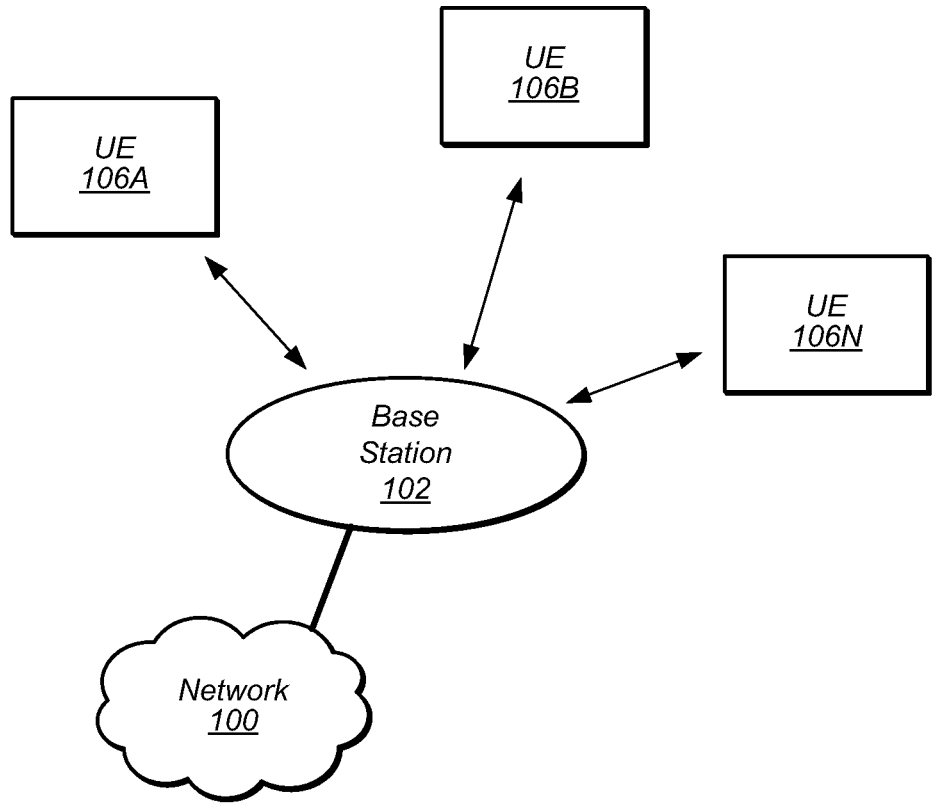
FIG. 1 illustrates an exemplary (and simplified) wireless communication system.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present patent application:
UE: User Equipment
BS: Base Station
GSM: Global System for Mobile Communication
UMTS: Universal Mobile Telecommunication System
LTE: Long Term Evolution
PDCCH: Physical Downlink Control Channel
PUCCH: Physical Uplink Control Channel
PDSCH: Physical Downlink Shared Channel
PUSCH: Physical Uplink Shared Channel

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPod™), laptops, tablets (e.g., iPad™, Android™-based tablets), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
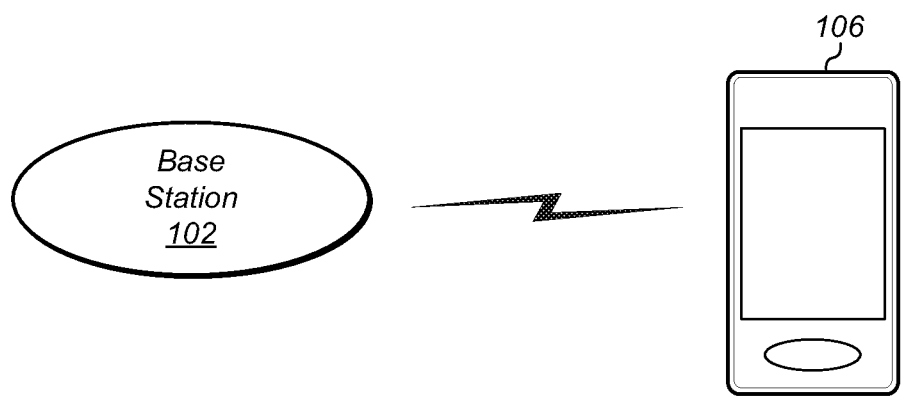
FIG. 2 illustrates a base station in communication with a wireless user equipment (UE) device.

FIGS. 1 and 2—Communication System

FIG. 1 illustrates an exemplary (and simplified) wireless communication system. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106-1 through 106-N. Each of the user devices may be referred to herein as a "user equipment" (UE). Thus, the user devices 106 are referred to as UEs or UE devices.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. The communication area (or coverage area) of the base station may be referred to as a "cell."

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1×RTT, 1×EV-DO, HRPD, eHRPD), Wi-Fi, WiMAX etc.

UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). Thus in some embodiments, the UE 106 might be configured to communicate with base station 102 according to a first cellular communication standard (e.g., LTE) and might also be configured to communicate with other base stations according to a second cellular communication standard (e.g., one or more CDMA2000 cellular communication standards). Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106-1 through 106-N) in communication with the base station 102. The UE 106 may be a device with wireless network connectivity such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of CDMA2000, LTE, LTE-A, WLAN, or GNSS. Other combinations of wireless communication standards are also possible.

The UE 106 may include one or more antennas for communicating using one or more wireless communication protocols. In some embodiments, the UE 106 may share one or more parts of a receive and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT, and separate radios for communicating using each of Wi-Fi and Bluetooth. Other configurations are also possible.

Figure 3:
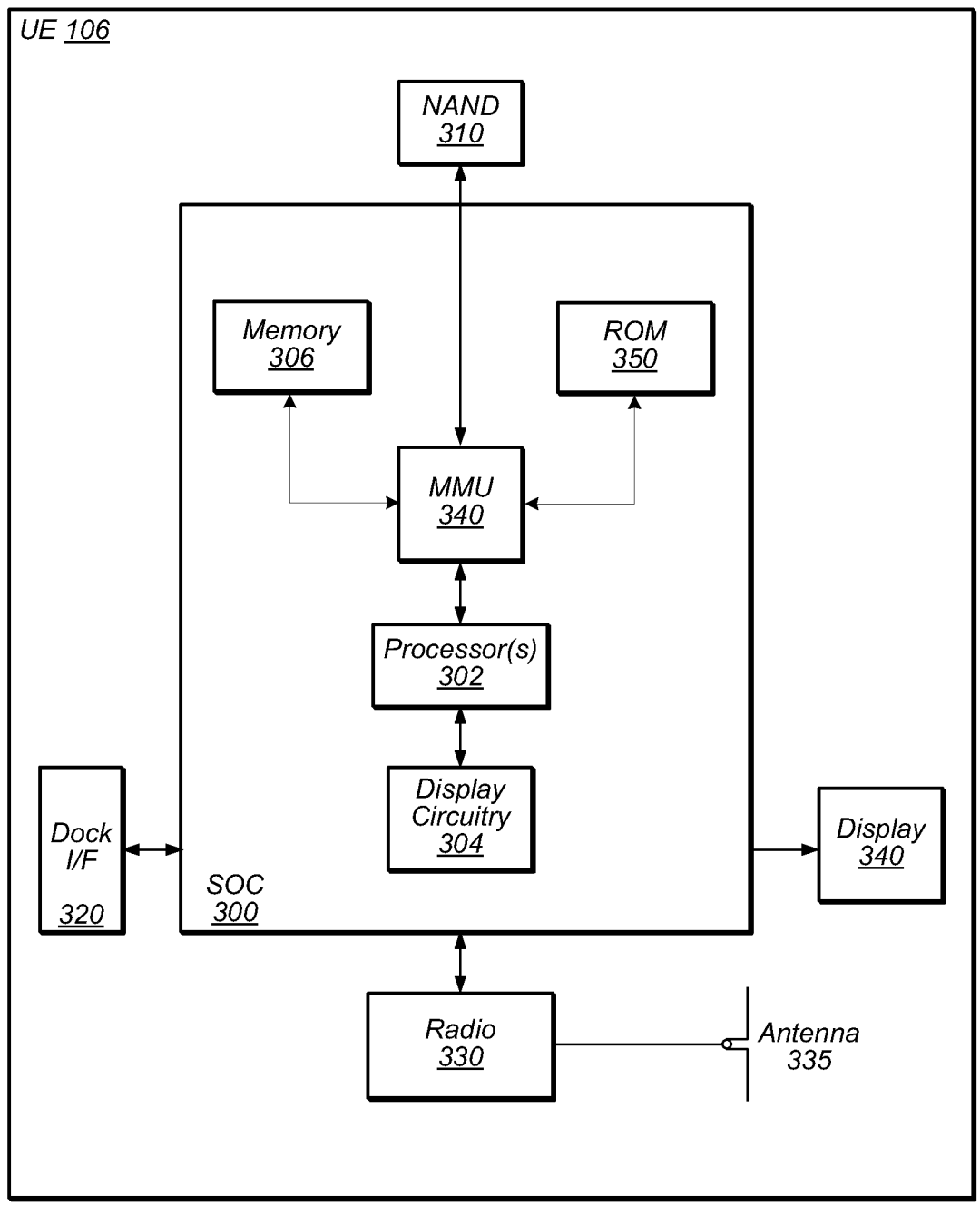
FIG. 3 illustrates an exemplary block diagram of a UE, according to one embodiment.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 340. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 340. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 340, and wireless communication circuitry (e.g., for LTE, LTE-A, CDMA2000, Bluetooth, Wi-Fi, GPS, etc.).

The UE device 106 may include at least one antenna, and possibly multiple antennas, for performing wireless communication with base stations and/or other devices. For example, the UE device 106 may use antenna 335 to perform the wireless communication. As noted above, the UE may be configured to communicate wirelessly using multiple wireless communication standards in some embodiments.

As described further subsequently herein, the UE 106 may include hardware and software components for implementing a method for performing C-DRX cycle scaling. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

Figure 4:
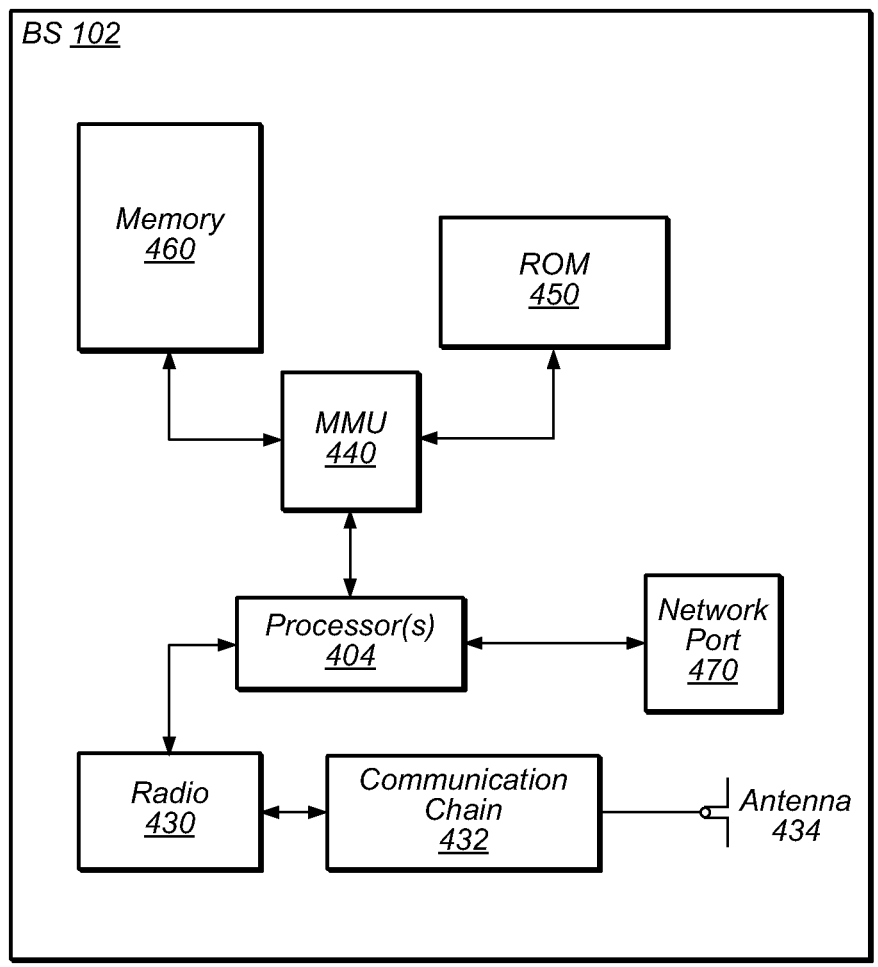
FIG. 4 illustrates an exemplary block diagram of a base station.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 102 may also be coupled to memory management unit (MMU) 440, which may be configured to receive addresses from the processor(s) 102 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A WCDMA, CDMA2000, etc.

The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

FIG. 5—Flowchart

Figure 5:
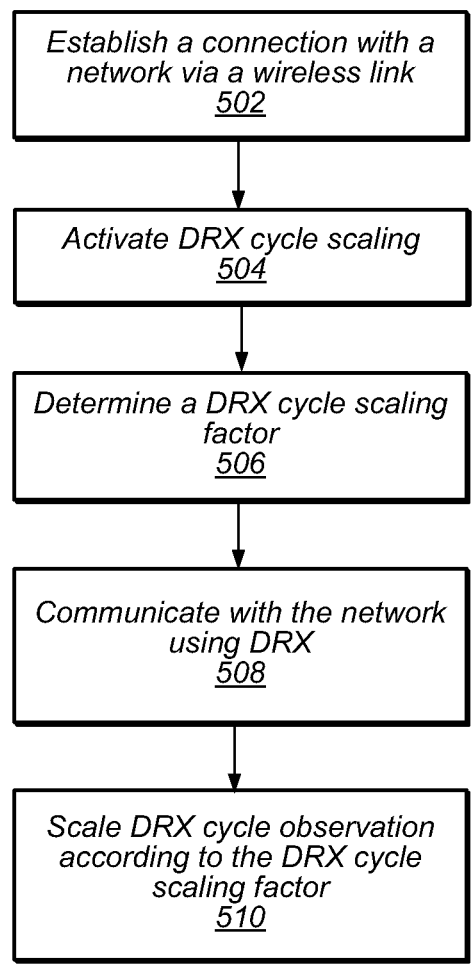
FIG. 5 is a flowchart diagram illustrating a method for a UE to synchronize uplink and downlink transmissions according to one embodiment.

FIG. 5 is a flowchart diagram illustrating a method for a UE device 106 to perform C-DRX cycle scaling. The method shown in FIG. 5 may be used in conjunction with any of the computer systems or devices shown in the above Figures, among other devices. For example, part or all of the method may be implemented by device logic of the UE 106, possibly in conjunction with a radio of the UE 106. In particular, part or all of the method may be implemented by baseband logic of the UE 106. The baseband logic may be configured to control operation of some or all radio components (which may be configured to operate according to one or more wireless communication protocols) included in the UE 106. The baseband logic (which may be implemented as a baseband software layer, as hardware logic, or a combination thereof, among various possibilities) may interact with other device components (e.g., higher software layers, such as application layers on which various applications executing on the UE 106 may operate). In various embodiments, some of the method elements shown may be performed concurrently, in a different order than shown, or may be omitted. Additional method elements may also be performed as desired. As shown, this method may operate as follows.

In 502, a connection with a network may be established via a wireless link, e.g., with a cell. The wireless link may operate according to any of various wireless technologies. The wireless link may be a cellular link according to a cellular technology such as GSM, UMTS, LTE, CDMA2000 (1×RTT, 1×EV-DO), etc. The cell may accordingly be provided by a base station 102 and may provide a connection to the network, which may be a core network, e.g., of a cellular service provider, or any other network, as desired. It may be common for the base station 102 to operate in conjunction with numerous other base stations (which may provide other cells) and other network hardware and software to provide continuous (or nearly continuous) overlapping wireless service over a wide geographic area.

The cell may serve the UE 106 and provide the connection to the network via the wireless link, and as such may act as the "serving" cell for the UE 106. There may also be one or more "neighboring" cells, provided by nearby base stations, with which the UE 106 may be capable of discovering, detecting signals from, and possibly communicating, but with which the UE 106 may not have an active wireless link.

Configuration information may be received from the cell and/or from the network as part of establishing the connection with the network. For example, as part of the process of attaching to the network (e.g., via the cell, or previously via another cell), the UE 106 may receive configuration information indicating various policies and procedures implemented by the network operator (e.g., the cellular service provider), according to which the UE 106 may be expected to operate.

The UE 106 (or certain components thereof, such as baseband layer components) may be configured to operate according to multiple possible modes of operation. For example, when a UE 106 is not actively exchanging data (e.g., as part of a call or a networking application such as a web browser) with the network, the UE 106 may typically operate in an idle mode, which may sometimes include "discontinuous reception" or "DRX" functionality. A UE 106 which supports idle-mode DRX may generally be inactive (e.g., with one or more components, such as radio and/or baseband components, powered down or sleeping) except for a window of activity during each DRX cycle. The active portion of a DRX cycle may be scheduled in a regular periodic manner; for example, many networks schedule the active portion of idle-mode DRX cycles to occur at 1.28 s intervals, or at some multiple of 1.28 s (e.g., 2.56 s, 5.12 s, etc). Other values for DRX periodicity may be used as desired.

During the active portion of an idle-mode DRX cycle, the UE 106 may perform certain actions according to the configuration of the UE 106 and/or according to configuration information received from the network. For example, the UE 106 may monitor a paging channel for incoming voice calls or data during the active portion of the idle-mode DRX cycle.

If it is determined that active data exchange is desired (e.g., for a voice call, a video chat application, a game, a networking/productivity application, or for any other application or service), the UE 106 may transition from the idle-mode to a connected-mode with the network. In the connected-mode, the UE 106 may establish data radio bearers in accordance with the wireless link with the cell, e.g., for exchanging control/signaling information and/or for transmitting uplink data and receiving downlink data. For example, according to LTE, a UE 106 operating in connected-mode might be configured to communicate with the network via one or more of a physical downlink control channel (PDCCH) (e.g., for receiving control/signaling information), a physical uplink control channel (PUCCH) (e.g., for transmitting control/signaling information), a physical downlink shared channel (PDSCH) (e.g., for receiving certain data, such as application data), and a physical uplink shared channel (PUSCH) (e.g., for transmitting certain data, such as application data), among other possible communication channels.

The UE 106 may further support a version of DRX in connected mode, which may be referred to as connected-mode discontinuous reception or C-DRX. For example, the UE 106 may be configured to perform data communications in a fully-active state (e.g., in which all communication-related device components are active). While in the active state, the UE 106 may monitor (e.g., via an inactivity timer or another means) activity/inactivity of data communications, and if a sufficient length of time passes in which no data communications are performed, the UE 106 may enter a reduced-power state (e.g., in which one or more communication-related device components, such as some or all radio and/or baseband logic components, are powered-down or enter a low power state, thereby reducing power consumption of the UE 106 relative to the active state) while remaining in connected-mode.

The UE 106 may be configured to re-enter the active state under certain conditions, e.g., in order to transmit uplink data and/or receive downlink data. For example, the UE 106 may re-enter the active state periodically (e.g., according to a schedule set by BS 102) to check whether downlink communications are desired (e.g., in which case an indication of a downlink grant may be received), or may re-enter the active state to transmit uplink data, e.g., in response to generation of uplink data by the UE 106 (e.g., by an application executing on the UE 106). In some embodiments, the UE 106 may periodically re-enter the active state to check whether downlink communications are desired, but may shortly thereafter again enter the reduced-power state without performing any data communications if no downlink (or uplink) communications are pending.

Thus, C-DRX may be similar to idle-mode DRX insofar as the UE 106 may alternate between an active state and a reduced power state when operating in C-DRX, but may also differ in certain ways. For example, data (e.g., application data) communications (e.g., via active data radio bearers) may be performed in the active state in C-DRX, whereas at least according to some embodiments, only indications that data communications are desired and other such control/signaling information may be communicated in the active state in idle-mode DRX. Other differences (e.g., shorter cycle lengths in C-DRX than in idle-mode DRX, etc.) and similarities are also possible depending on how the idle-mode DRX and connected-mode DRX are implemented. Further details of an exemplary implementation of a C-DRX feature are also provided hereinbelow with respect to FIG. 6.

Thus, at various times the UE may operate in an idle-mode (e.g., including idle-mode DRX operation) or in a connected-mode (e.g., including C-DRX operation) according to the connection established with the network via the wireless link in 402.

While the UE is operating in the connected mode, an indication or command to perform DRX cycle scaling may be received. The indication may be provided to the baseband logic/layer of the UE 106 by an application (e.g., executing at an application layer of the UE 106), or may be generated internally by the baseband logic/layer of the UE 106, among various possibilities.

Based on the indication or command, in 504 DRX cycle scaling (e.g., C-DRX cycle scaling) may be activated. DRX cycle scaling (e.g., scaling down the frequency at which the active portion of DRX cycles are observed) may, at least in some situations, increase the amount of time that the UE 106 may spend in the reduced power state of C-DRX relative to the amount of time that the UE 106 spends in the active state, thereby improving battery power savings relative to C-DRX operation in which DRX cycle scaling is not performed. DRX cycle scaling may be particularly helpful in situations in which battery conservation or thermal mitigation are unusually important (e.g., if the UE 106 has very little battery power remaining or if the UE 106 is experiencing severe thermal escalation/very high temperatures). DRX cycle scaling may also be desirable even if there isn't an immediate power-related or thermal-related concern in order to conserve battery power. For example, for some applications which are not particularly delay sensitive (e.g., which are capable of tolerating high latencies with minimal or no negative effect on user experience and/or which have low or no quality of service (QoS) requirements), or if the UE 106 isn't being actively used by a user (e.g., as might be indicated by observing one or more user interface elements of the UE 106 being off or in a low-power state), the potential battery life extension provided by implementing DRX cycle scaling may be more desirable than the potentially improved device performance (e.g., reduced latency) provided by not implementing DRX cycle scaling.

The indication might be generated internally by the baseband logic in any of a variety of ways and for any of a variety of reasons. For example, according to one set of embodiments, the indication might be generated based on detecting that a condition has occurred, as a result of which it may be desirable to activate DRX cycle scaling. Such a condition might include the battery level of the UE falling below a battery level threshold, a temperature of the UE (or a portion of the UE) exceeding a thermal mitigation threshold, detection (or reception of an indication of) of a type of application/traffic pattern (such as web-browser/single occasion query-response) which is relatively delay-insensitive or has low or no QoS requirements, and/or detection (or reception of an indication of) powering down of one or more user interface elements (e.g., screen/display) of the UE 106. Other conditions, and/or variations of the above-mentioned conditions, are also possible.

The indication might similarly be generated by another component of the UE 106 (or by the network or another device with which the UE 106 is in communication) and provided to the baseband logic in any of a variety of ways and for any of a variety of reasons. For example, the other component may detect one of the above-described conditions (or any other condition configured to act as a trigger to generate the indication to activate DRX cycle scaling), and may provide the indication through internal communication within the UE 106 or via wireless communication (e.g., from the network or another device with which the UE 106 is in communication). As one possibility, the indication may be generated by an application which generates a type of traffic (such as web-queries) which is particularly suitable for DRX cycle scaling, such as a web browser. Alternatively, e.g., if the indication is generated internally by the baseband logic, an indication may be provided to one or more applications executing on the UE 106 that DRX cycle scaling is being activated. This may allow the application(s) to adjust their operation (e.g., adjust transmission rate/timing, bundle traffic in different burst sizes, and/or make other adjustments), if desired, based on the knowledge that DRX cycle scaling is being activated.

In 506, as a result of (e.g., in response to) activating the DRX cycle scaling feature in 404, the UE 106 (e.g., baseband logic executing in the UE 106) may determine a DRX cycle scaling factor. The DRX cycle scaling factor may indicate a frequency at which to observe scheduled wakeup periods of times (on-durations) of DRX cycles. For example, the DRX cycle scaling factor may be a ratio of observed to skipped DRX cycle on-durations. Considered another way, the DRX cycle scaling factor may indicate what fraction of DRX cycle on-durations to observe (or what fraction not to observe, e.g., how often to remain in the reduced-power state during a scheduled on-duration rather than waking up).

The DRX cycle scaling factor may be indicated to the baseband layer as part of or in conjunction with the indication or command to initiate DRX cycle scaling. Alternatively, the baseband layer may calculate or determine the DRX cycle scaling factor itself, possibly based on information provided with the indication or command to initiate DRX cycle scaling. For example, an indication of a preference for minimal, medium, or maximal DRX cycle scaling might be received from an application from which the indication/command may be received, e.g., based on the type of application. Thus, a web browser application for which delay tolerance may be high might indicate a preference for maximal DRX cycle scaling, while a video streaming application for which some delay tolerance might exist (e.g., because video frames may be buffered) might indicate a preference for minimal or medium DRX cycle scaling. An application with low delay tolerance might indicate a preference for minimal DRX scaling, or more likely, might not indicate to initiate DRX cycle scaling at all (and/or might indicate to turn off DRX cycle scaling if it is on)

Similarly, different levels of DRX cycle scaling might be indicated in combination with a battery- or thermal-threshold induced command to initiate DRX scaling, e.g., depending on the severity of the condition (e.g., very low battery or very high temperature might be cause for maximal DRX cycle scaling, while less severe conditions might be cause for minimal or moderate DRX cycle scaling).

The DRX cycle scaling factor may also be determined in a manner configured to avoid causing failure of the wireless link (e.g., a radio link failure or "RLF"). For example, many networks will attempt to retransmit any data which is not acknowledged/received successfully by a UE 106 a certain number of times, after which if the data still has not been successfully transmitted, the network may declare RLF and release the wireless link between the UE 106 and the network. As long as the network configuration is such that for a given scaling factor, any transmission which is attempted during a DRX cycle on-duration which would be skipped according to the scaling factor would be received (under normal reception conditions) during a subsequent DRX cycle on-duration which would be observed (e.g., would not be skipped) according to the scaling factor, the given scaling factor may not be expected to cause (or increase the likelihood of causing) failure of the wireless link.

Thus, based on the network configuration, the UE 106 may determine that at least certain scaling factors are valid scaling factors (e.g., DRX cycle scaling factors for which there is not a chance of radio link failure under normal reception conditions). For example, the UE 106 may perform calculations based on characteristics of the wireless link (e.g., certain network parameters such as DRX cycle length, on-duration cycle length, a number of retransmissions provided by the network before determining that the wireless link has failed, and an amount of time between retransmissions) based on which it may determine which (if any) DRX cycle scaling factors are valid for the network configuration. Note also that in some implementations, further (or simply different) network configuration parameters may be considered than those just described; for example, according to some LTE implementations, multiple C-DRX cycles may be configured, such that the network parameters might include a short C-DRX cycle length, a number of short C-DRX cycles performed, and a long C-DRX cycle length. As another example, retransmissions may be performed by different communication layers in the LTE system; for example, data may be retransmitted multiple times as part of hybrid automatic repeat request (HARQ) retransmissions (e.g., implemented at a media access control (MAC) layer) and radio link control (RLC) retransmissions (e.g., implemented at an RLC layer). In this case, network parameters might include numbers of each of HARQ retransmissions and RLC retransmissions, and amounts of time between each of HARQ retransmissions and RLC retransmissions. Further details according to one exemplary such implementation are also provided hereinbelow with respect to FIGS. 7-15.

Once valid DRX cycle scaling factors have been calculated, the UE 106 may determine the DRX cycle scaling factor which will be used. If desired, a valid DRX cycle scaling factor which provides a greatest amount of scaling may be selected, e.g., for maximum power savings. For example, if the valid DRX cycle scaling factors for a given network configuration were $\frac{1}{2}$, $\frac{1}{3}$, or $\frac{1}{4}$, the DRX cycle scaling factor selected might be $\frac{1}{4}$ (e.g., indicating that one scheduled on-duration would be observed per four DRX cycles, while the UE 106 would remain in a reduced-power state during the other three scheduled on-durations). Alternatively, as noted above, actual selection of a scaling factor may be based partially on an indication or detection of a condition for which a certain (e.g., minimal-or-maximal, low-medium-or-high, etc.) level of DRX cycle scaling may be appropriate. In this case, if an indication were received or condition were detected to initiate minimal DRX cycle scaling, the UE 106 might select $\frac{1}{2}$ (e.g., indicating that one scheduled on-duration would be observed per two DRX cycles, while the UE 106 would remain in a reduced-power state during the other scheduled on-duration) as the DRX cycle scaling factor.

In 508, at some point after (or while) the DRX cycle scaling factor is determined, the UE 106 may communicate with the network using C-DRX over the course of multiple C-DRX cycles. As noted above, each C-DRX cycle may include a period of time during which the UE 106 operates in a reduced-power state (e.g., where the UE 106 is 'sleeping') and a scheduled wakeup or on-duration period of time.

In 510, during the communication with the network using C-DRX (while DRX cycle scaling is activated), C-DRX cycle observation may be scaled according to the determined DRX cycle scaling factor. In other words, the UE 106 may observe (wake up for) certain of the on-durations and may skip (remain in the reduced-power state for) certain of the on-durations, in proportion with the DRX cycle scaling factor.

It should be noted that it may be preferable for DRX cycle scaling may be applied to data transmissions (e.g., transmissions of application data) but not to signaling (e.g., protocol-related) transmissions. For example, while many applications may not be significantly affected by slight delays in data transmission resulting from missing one or more DRX cycle on-durations, delays in signaling transmissions (e.g., which might relate to handover between cells, communication channel setup, NAS-related communications, and/or any of various other protocol related functions) may have a noticeable detrimental affect on device performance, at least in some cases. Thus, for example, if a paging occasion is scheduled, or if a Timing Advance (TA) command is expected (e.g., if a timing alignment timer is close to expiration and no TA command has yet been received), for a DRX cycle on-duration which would normally be skipped while DRX cycle scaling is active, the UE 106 may observe the on-duration rather than skip it.

Note also that in implementations for which the network configures both short C-DRX cycles and long C-DRX cycles, DRX cycle scaling may be activated for either or both types of C-DRX cycles.

At some point, it may be desirable to cease performing DRX cycle scaling. For example, if an application which is highly delay sensitive (e.g., a voice or video chat application) and/or has high QoS requirements becomes active, or if the UE 106 is coupled to an external power supply (e.g., a dock or charging station), the importance of device performance relative to power savings may increase. In this case (or any of a number of other possible situations), a command or indication may be received to de-activate or cease performing DRX cycle scaling may be received. Similar to the command/indication to initiate DRX cycle scaling, the command/indication to cease performing DRX cycle scaling may be generated internally (by the baseband layer) or received from an external source (e.g., an application layer, the network, or another external source). After such a command or indication is received, DRX cycle observation may no longer be scaled while communicating with the network using C-DRX. In other words, the UE 106 may observe all scheduled on-duration periods rather than skipping (remaining in a reduced-power state during) a fraction of scheduled on-durations once C-DRX cycle scaling is no longer activated.

It is also possible that it may be desirable to change or modify an amount of DRX cycle scaling used. For example, if the battery condition changes from "low" to "very low", it might be desirable to increase DRX cycle scaling in order to reduce power usage and further extend the battery life of the UE 106. Thus in some cases a command or indication may be received to modify an amount of DRX cycle scaling. The command or indication might dictate a new DRX cycle scaling factor to be used, or a new DRX cycle scaling factor might be determined based on the command or indication. The new DRX cycle scaling factor may induce a greater amount of scaling (e.g., based on decreasing battery life, as just noted, or based on a less delay sensitive application becoming active while a more delay sensitive application becomes inactive, or for other reasons) or a lesser amount of scaling (e.g., based on more delay sensitive application becoming inactive, or for other reasons)

Thus, by utilizing the method of FIG. 5 as provided above according to various embodiments, a UE 106 may advantageously perform C-DRX cycle scaling in order to maximize time in reduced-power state as part of C-DRX operation. In particular, reducing the frequency with which the UE 106 is fully active in C-DRX to ½, ⅓, ¼, ⅙, ⅛, ⅟₁₀, or any other fraction may significantly and directly reduce power usage. Furthermore, by carefully determining and using scaling factors which are not likely to result in radio link failure and implementing C-DRX cycle scaling in situations in which any resulting link quality deterioration will be minimally or not noticeable or outweighed by power savings benefits, the UE 106 may thereby conserve battery while still providing a high-quality user experience.

FIGS. 6-15—Exemplary C-DRX Operation and Scaling Factor Validity Calculations FIGS. 6-11 are timing diagrams illustrating exemplary baseband operations of a UE 106. In particular, the illustrated diagrams relate to an exemplary implementation in which the UE 106 is configured for wireless communication according to LTE, and supports C-DRX operations. FIGS. 12-15 are graphs illustrating results of scaling factor validity calculations according to various possible network configurations. While numerous specific details of the exemplary set of embodiments of FIGS. 6-15 are provided hereinbelow by way of example, it will be recognized by those of skill in the art that any number of variations on or alternatives to the specific details of the exemplary embodiments of FIGS. 6-15 may be implemented if desired, and that accordingly the description provided with respect thereto should not be considered limiting to the disclosure as a whole.

Figure 6:
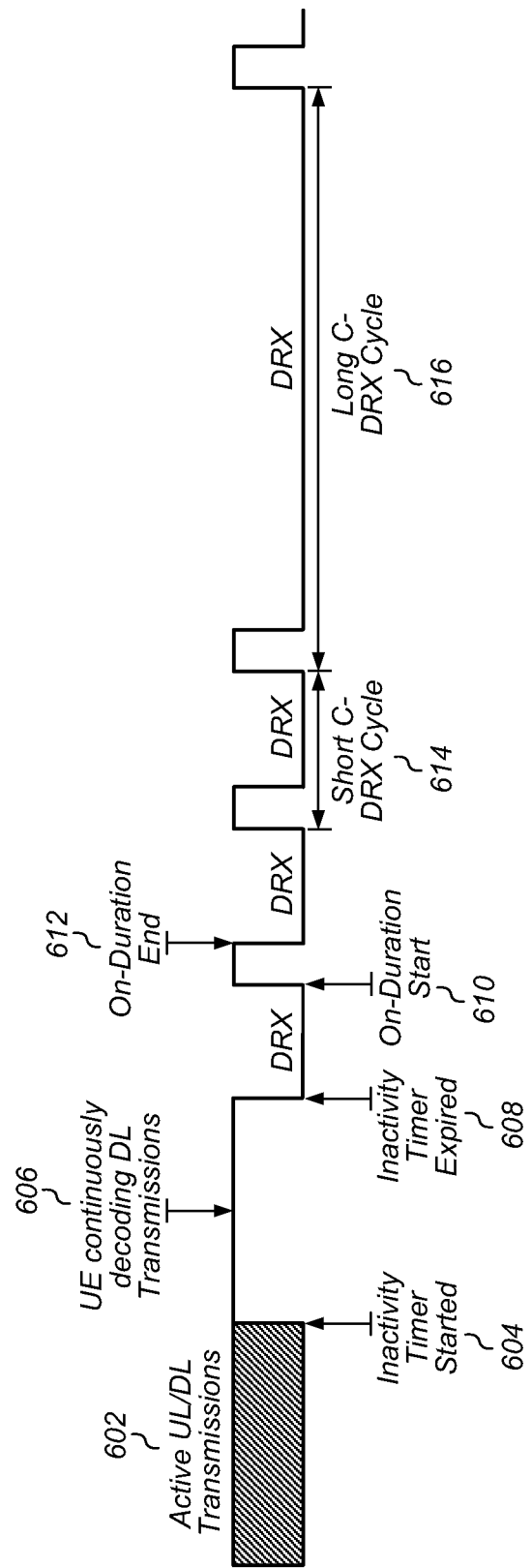
FIGS. 6-11 are timing diagrams illustrating operations of a C-DRX capable UE over a period of time according to several sets of embodiments.

FIG. 6 illustrates various aspects of C-DRX operation generally. As shown, in 602, the UE 106 may operate in an active state and may perform one or more uplink and/or downlink transmissions (e.g., transmit uplink data and/or receive downlink data).

At 604, an inactivity timer may be initiated. The inactivity timer may be initiated at the end of the active transmissions in 602. Note that the inactivity timer may have been initiated one or more times during the active transmissions in 6502, but may have been reset each time as a result of continuing activity (transmissions) until no more activity was observed at 604, at which point it may run until expiration at 608. The inactivity timer may have any length, as desired; some examples of possible inactivity timer length might include 100 ms, 80 ms, 50 ms, 40 ms, or any other value, e.g., as specified by the 3GPP 36.331 specification.

In 606, between initiation (at 604) and expiration (at 608) of the inactivity timer, the UE 106 may not be performing any uplink or downlink transmissions, but may continue to operate in the active state, and may monitor one or more communication channels (e.g., a PDCCH) for downlink grants.

At 608, the inactivity timer may expire. At this point the UE 106 may transition to a reduced-power state (DRX), as a result of having observed a sufficient period of data communication inactivity (e.g., as indicated by the expiration of the inactivity timer). During the period of time that the UE 106 is operating in the reduced-power state, the UE 106 may power down and/or reduce power to one or more components, such as baseband logic components and/or radio components.

At 610, the UE 106 may "wake-up" and re-enter the active state. The UE 106 may wake up at a time specified by a schedule, e.g., of which it may be informed by a base station (e.g., an eNode-B, in LTE). At the specified time (or after a specified interval), the base station may notify the UE 106 of a downlink grant for the UE 106, if there is any downlink data pending, so the UE 106 may check (e.g., monitor a communication channel such as a PDCCH) for downlink grants during this time. One or more other functions may also be performed during this time, if desired. This time period may also be referred to as the "on-duration" in C-DRX operation. According to some embodiments, the on-duration may last a specified length of time, such as 5 ms, or 10 ms, or another length of time, e.g., as specified by the 3GPP 36.331 specification; alternatively, the on-duration may last until certain functions have been performed, and may end when no further specified functions need to be performed.

At 612, the on-duration may end, and if no downlink grants were received during the on-duration, the UE 106 may go back to "sleep" and transition back into the reduced-power state. Any number of subsequent cycles of sleeping (DRX) and waking (on-duration) may be performed, as desired.

Note that the UE 106 may also be configured to transition between C-DRX cycles with different lengths. For example, as shown, the UE 106 may perform up to a pre-determined number (such as 2, 4, 8, 16, etc.) of "short C-DRX" cycles 614 (which may last 20 ms, 40 ms, 80 ms, or any other length of time), and if no uplink or downlink transmission are performed by the end of the pre-determined number of cycles, the UE 106 may perform one or more "long C-DRX" cycles 616 (which may last 80 ms, 160 ms, 320 ms, or any other length of time, e.g., as specified by 3GPP 36.331), which may specify a longer period of reduced-power state operation before waking up for active state on-duration operations. The long C-DRX cycles may continue until further active communication (e.g., which may be initiated either by the UE 106 or the network) occurs, or one or more other conditions occur which might cause the UE 106 to transition away from the long C-DRX cycles.

If active communications are again initiated at some subsequent time, the UE 106 may perform similar steps (e.g., monitoring activity/inactivity via an inactivity timer and initiating one or more C-DRX cycles if sufficient inactivity is seen between active communications) if appropriate, e.g., depending on communication activity.

As described with respect to FIG. 5, under some circumstances C-DRX cycle scaling may be possible. FIGS. 7-11 illustrate operation of a UE 106 with and without various possible DRX cycle scaling factors. In particular, in each of FIGS. 7-11, C-DRX operation in which the network specifies both short and long C-DRX cycles, including specifying that 16 short C-DRX cycles may occur before the UE 106 transitions to long C-DRX cycles, are illustrated.

Figure 7:
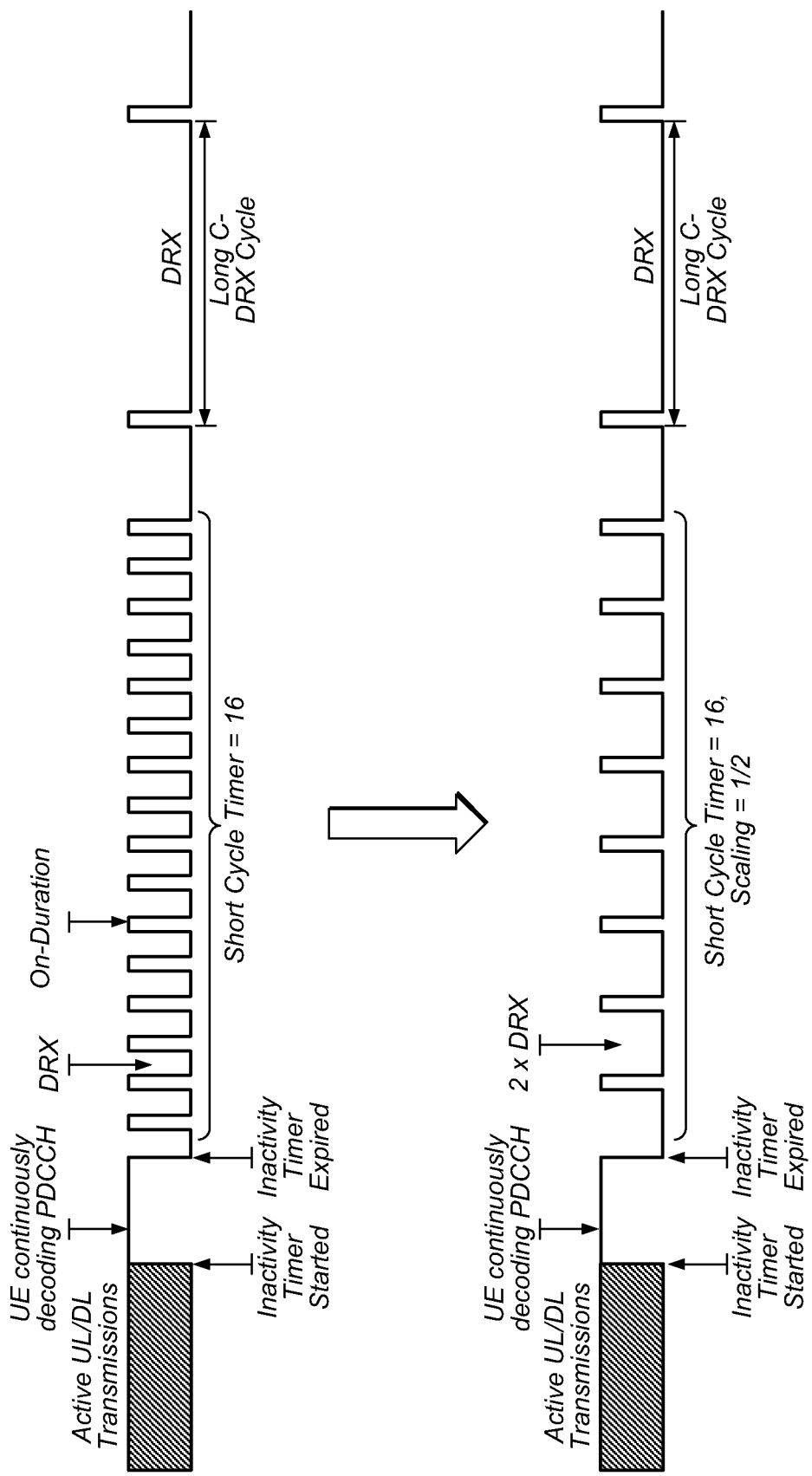

In the scenario illustrated in FIG. 7, the DRX cycle scaling factor may be ½ and may be applied to the short C-DRX cycles. In other words, the UE 106 may observe the on-duration scheduled in every second short C-DRX cycle, and may remain asleep in between.

Figure 8:
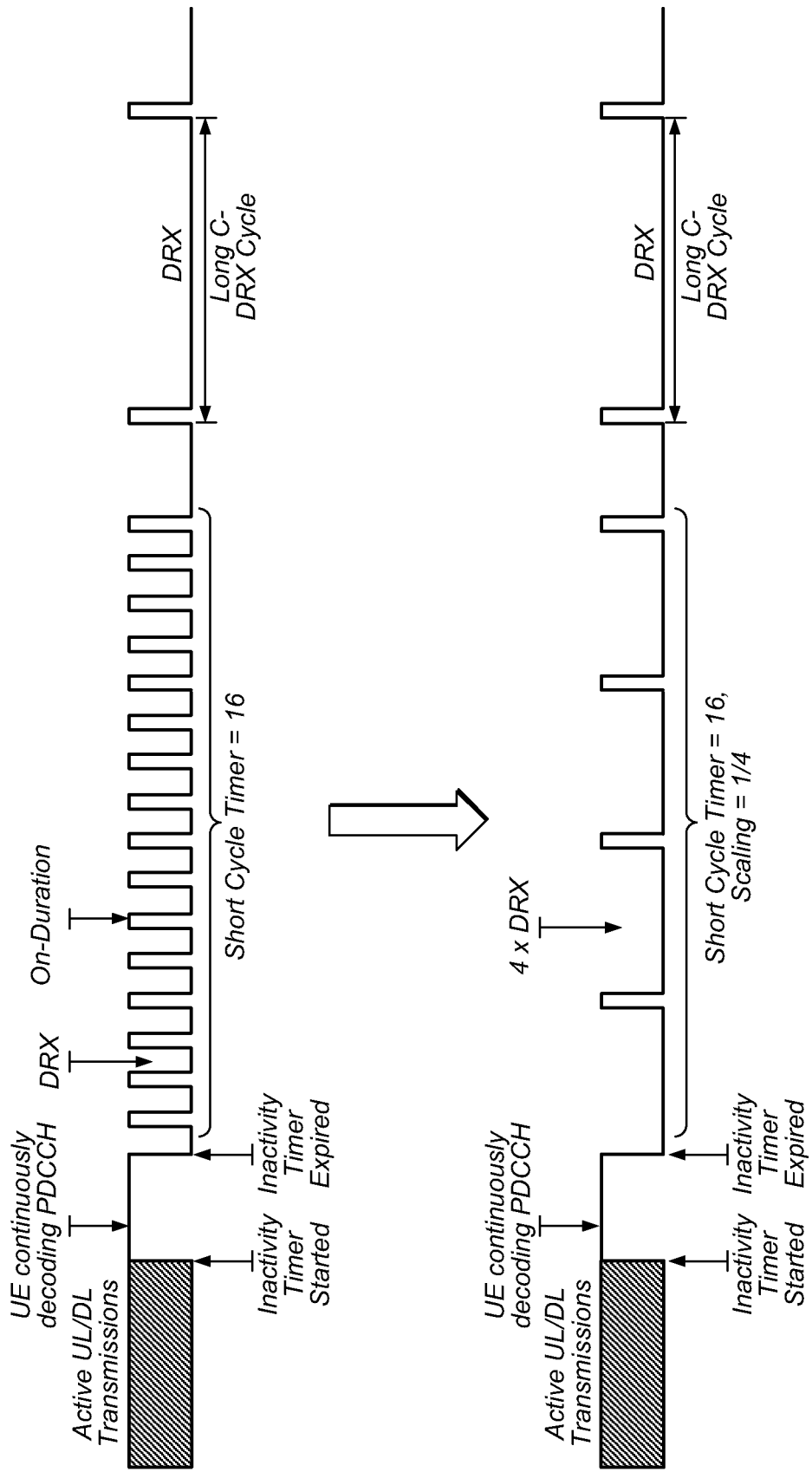

In the scenario illustrated in FIG. 8, the DRX cycle scaling factor may be ¼ and may be applied to the short C-DRX cycles. In other words, the UE 106 may observe the on-duration scheduled in every fourth short C-DRX cycle, and may remain asleep in between.

Figure 9:
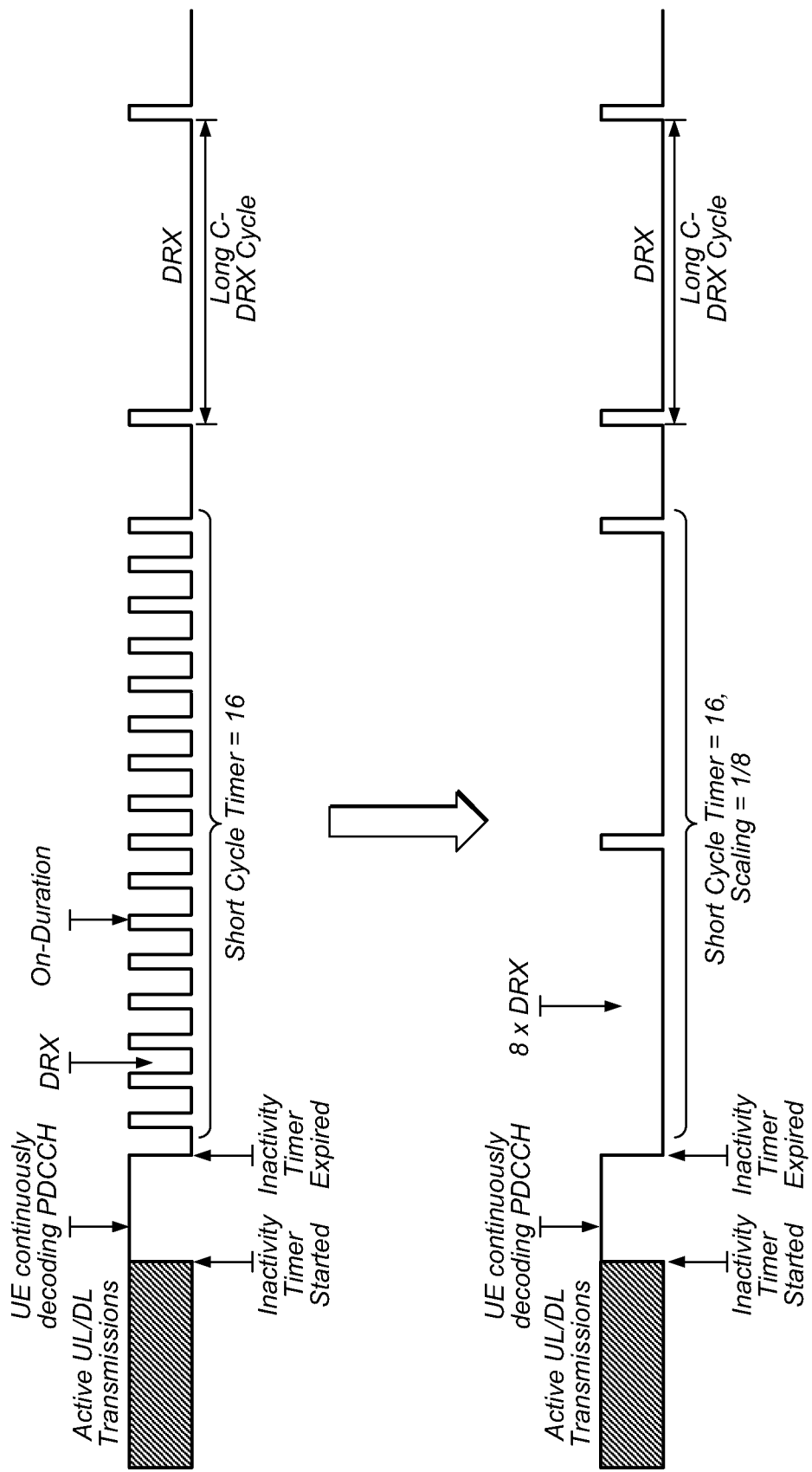

In the scenario illustrated in FIG. 9, the DRX cycle scaling factor may be ⅛ and may be applied to the short C-DRX cycles. In other words, the UE 106 may observe the on-duration scheduled in every eighth short C-DRX cycle, and may remain asleep in between.

Figure 10:
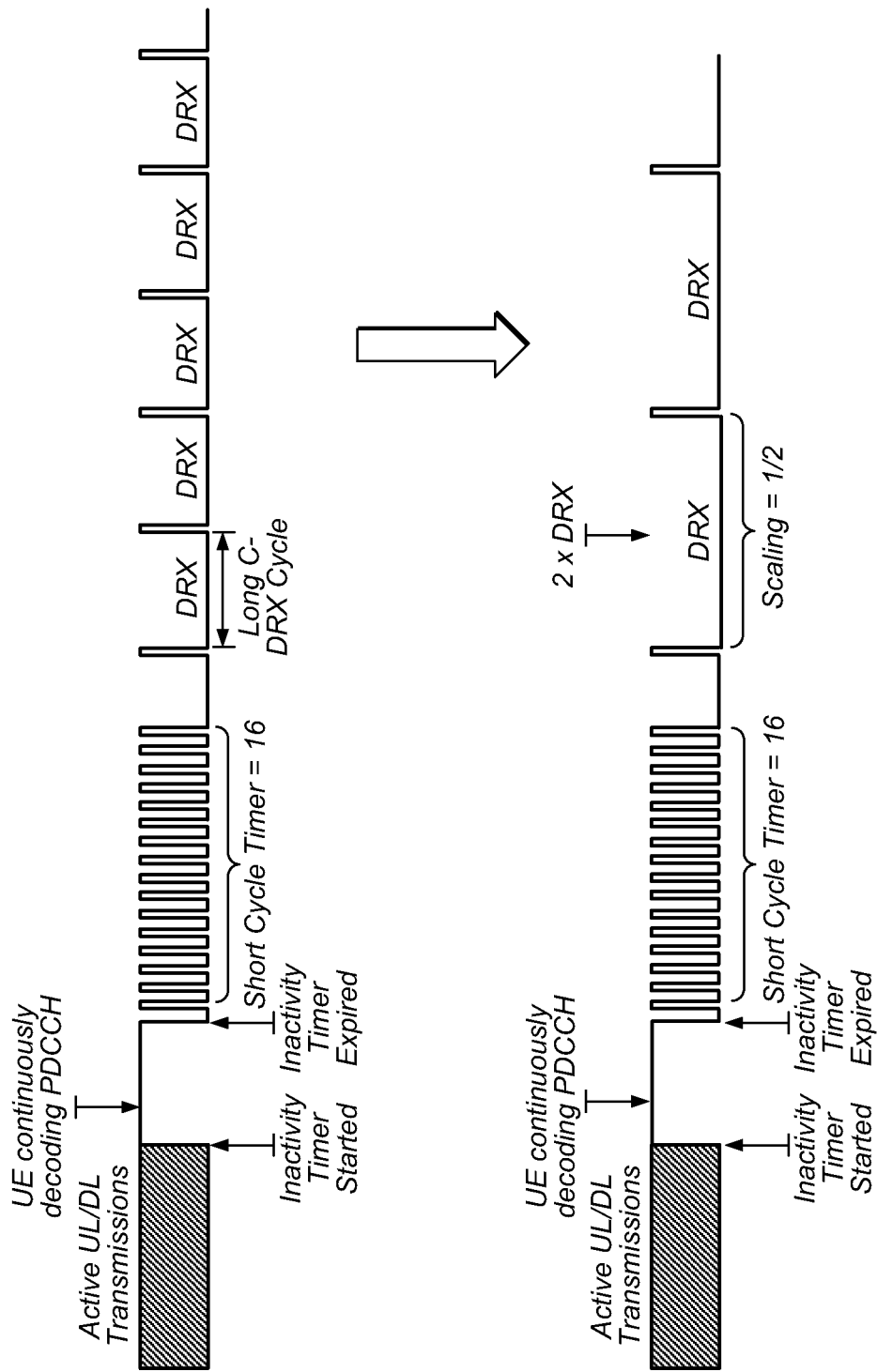

In the scenario illustrated in FIG. 10, the DRX cycle scaling factor may be ½ and may be applied to the long C-DRX cycles. In other words, the UE 106 may observe the on-duration scheduled in every second long C-DRX cycle, and may remain asleep in between.

Figure 11:
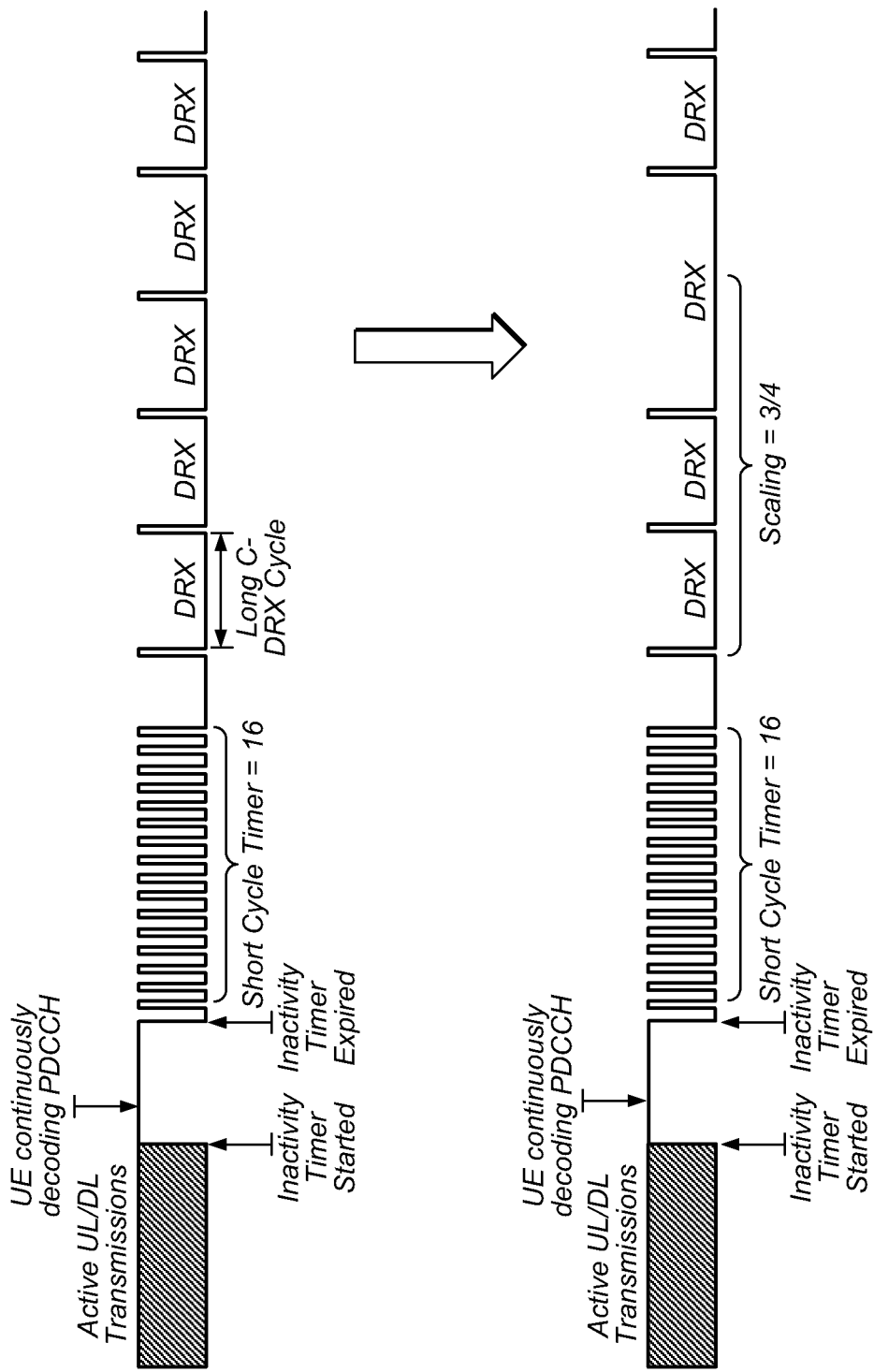

In the scenario illustrated in FIG. 11, the DRX cycle scaling factor may be ¾ and may be applied to the long C-DRX cycles. In other words, the UE 106 may observe the on-duration scheduled in three out of every four long C-DRX cycles, and may remain asleep during the fourth C-DRX cycle.

Note that any number of other DRX cycle scaling factors may be used as desired, including but not limited to ⅚, ⅘, ⅔, ⅓, ⅕, ⅙, 1/7, 1/9, 1/10, etc. However, it may be desirable to confirm that any desired DRX cycle scaling factor does not significantly increase the chance of a radio link failure for a given network configuration.

For example, as briefly described hereinabove with respect to FIG. 5, a network (e.g., an LTE network operated by a cellular service provider/carrier) may specify certain characteristics of C-DRX (and/or more general) operation. Based on these characteristics, it may be possible to calculate the likelihood that utilizing a certain DRX scaling factor will cause radio link failure, assuming normal reception conditions. For example, if the network will retransmit a transmission a certain number of times (and at certain intervals) before declaring radio link failure, it may be calculated for each candidate DRX scaling factor whether there is any chance of missing all such retransmissions for a given transmission. If desired, then, only DRX scaling factors for which there is 100% chance of receiving at least one such retransmission may be used for a particular network configuration.

As a specific example, consider the exemplary C-DRX operations illustrated in and described with respect to FIGS. 6-11. The network specifies both a short C-DRX cycle and a long C-DRX cycle. Configuration parameters may accordingly include the short C-DRX cycle length, the long C-DRX cycle length, and the number of short C-DRX cycles, and the length of the on-duration periods of time ("OnDurationTimer", e.g., 10 ms, 5 ms, or any other number). In this example, consider that the network may attempt both HARQ retransmissions and RLC retransmissions. In particular, the network may attempt up to a certain number of HARQ retransmissions ("Max_HARQ_ReTx", e.g., 4 retransmissions, 8 retransmissions, or any other number), with a certain amount of time between each HARQ retransmission ("HARQ_RTT", e.g., 8 ms). Once HARQ_RTT*Max_HARQ_ReTx ms have elapsed without successful reception, an indication may be provided to the RLC entity, which will schedule an upcoming RLC retransmission after a certain amount of time ("t_PollRetransmit", e.g., 45 ms, 50 ms, or any other number). If a maximum number of RLC retransmissions ("maxReTxThreshold", e.g., 16 retransmissions, 32 retransmissions, or any other number) occur without successful reception, the network may declare radio link failure. Thus, the total time from a first transmission to radio link failure may be t_PollRetransmit*maxReTxThreshold.

In order to avoid radio link failure for a given set of the above-described parameters, then, at least one HARQ transmission for any RLC transmission must arrive in at least one on-duration for which the UE 106 will be active and able to decode the transmission. Accordingly, it may be possible to use the below equation to determine whether a particular scaling factor is a "valid" scaling factor (e.g., one for which the probability of a radio link failure occurring is minimized) for a given set of parameters. In particular, a scaling factor may be considered valid when the below condition is met for any j, k, and all Tx_Offsets:

$$|j * \text{t\_Poll Retransmit} + k * \text{HARQ\_RTT} + \text{Tx\_Offset}| \left( \frac{DRXCycle}{Scaling} \right) <$$

$$\text{OnDurationTimer}$$

where:
- j=0, 1, . . . n; being n=maxReTxThreshold
- k=0, 1, . . . m; being m=Max_HARQ_ReTx
- TX_Offset=0, 1, . . . p−1 being p=OnDurationTimer FIGS. 12-15 are graphs illustrating the probability of decoding a transmission before radio link failure under a particular set of configuration parameters for a variety of possible DRX cycle scaling factors and DRX cycle lengths, as might be calculated based on the above equation.

Figure 12:
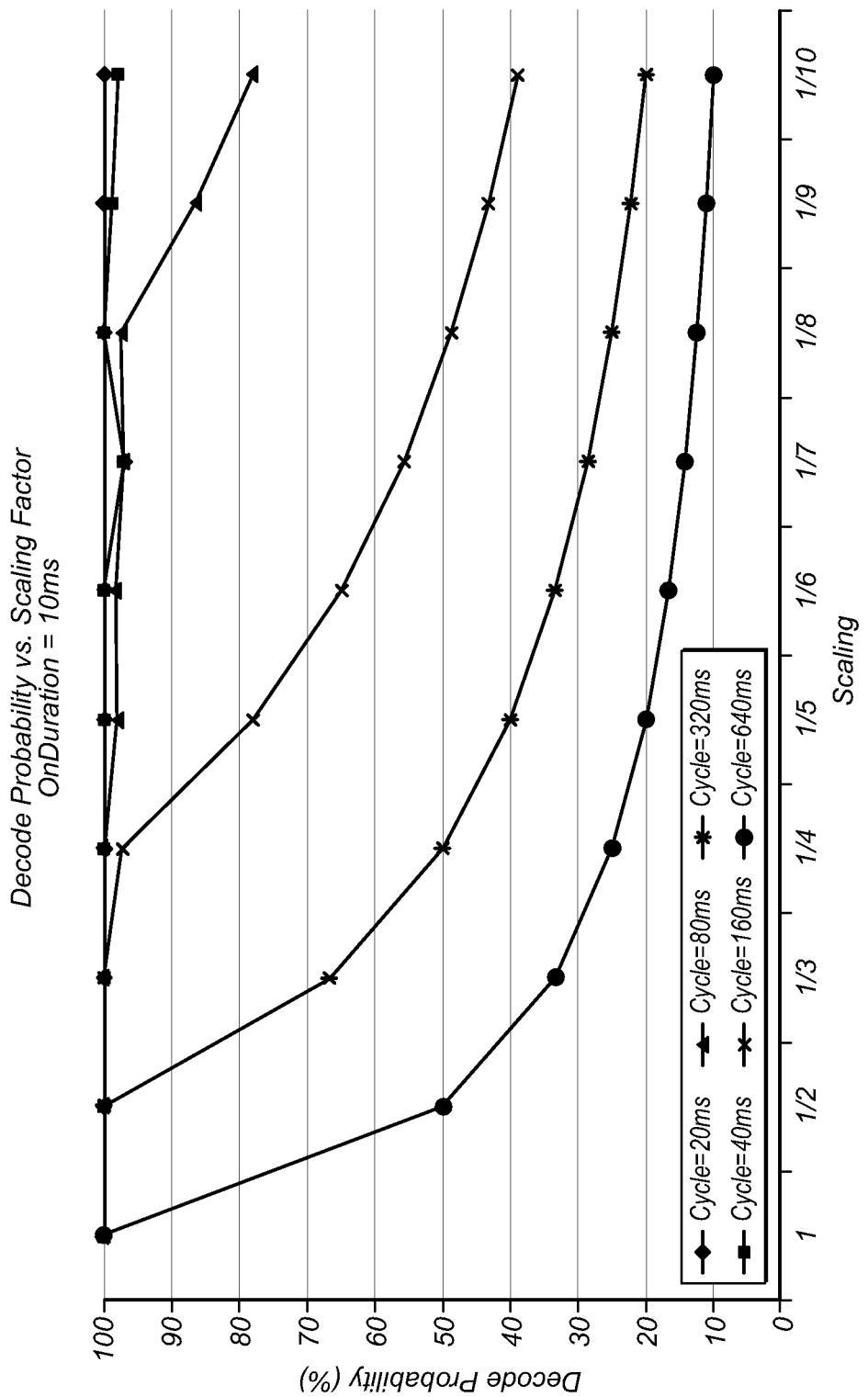
FIGS. 12-15 are graphs illustrating decode probability vs. scaling factor for various C-DRX cycle lengths according to several sets of embodiments.

FIG. 12 illustrates a scenario in which the OnDurationTimer has a length of 10 ms, maxReTxThreshold=16, Max_HARQ_ReTx=4, HARQ_RTT=8 ms, and t_PollRetransmit=35 ms. As shown, there may be a 100% probably of decoding a transmission before radio link failure for a 20 ms DRX cycle for all scaling factors shown except 1/7. For each longer DRX cycle length, more scaling factors may be invalid; 1/9 and 1/10 are also invalid for 40 ms, to which 1/8, 1/6, and 1/5 are added for 80 ms, while for a DRX cycle length of 160 ms only 1/2, and 1/3 are valid scaling factors, for a DRX cycle length of 320 ms only 1/2 is a valid scaling factor, and for a DRX cycle length of 640 ms there are no valid scaling factors (a scaling factor of 1 is equivalent to no scaling).

Figure 13:
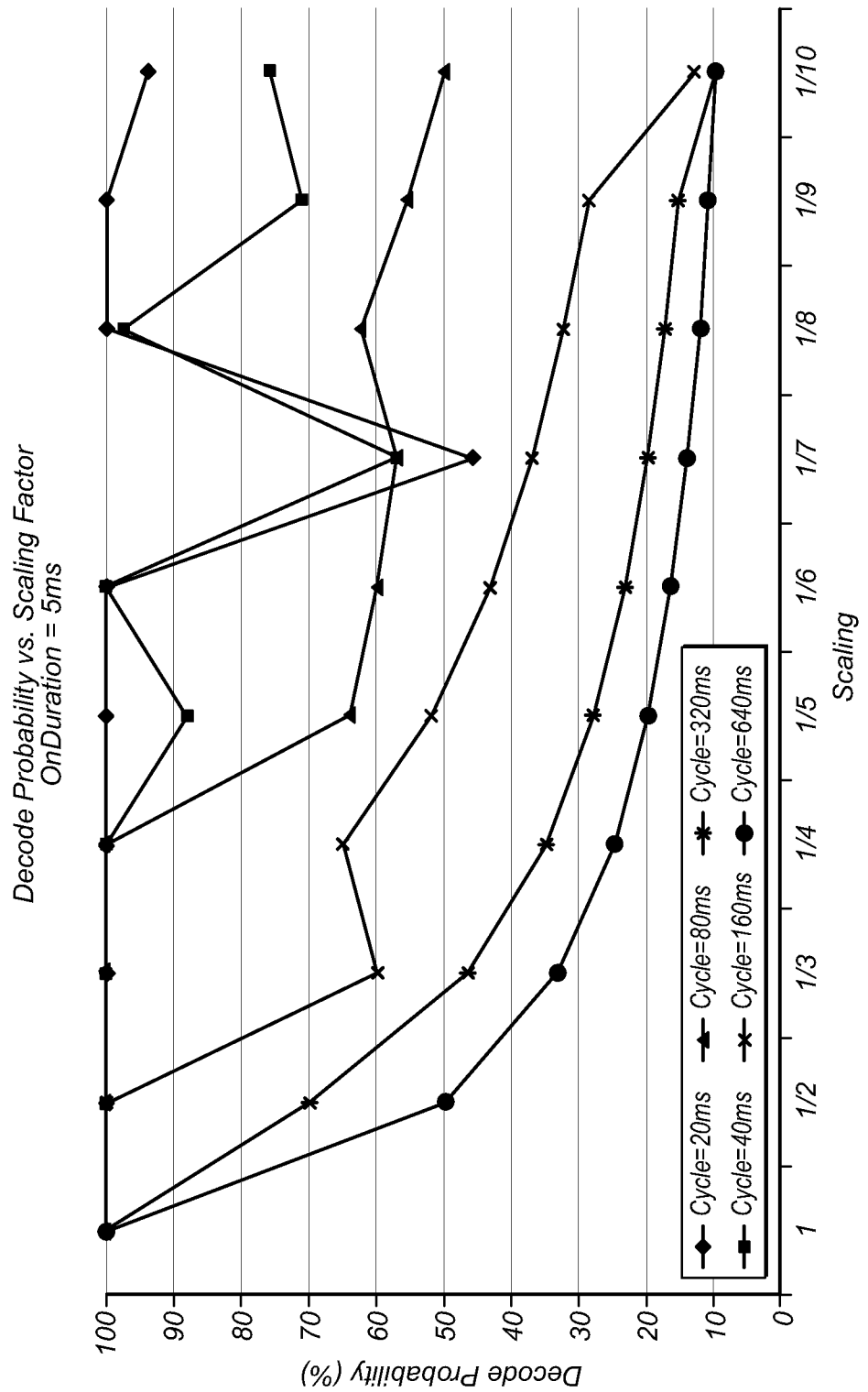

FIG. 13 illustrates a scenario in which the OnDurationTimer has a length of 5 ms, while maxReTxThreshold=16, Max_HARQ_ReTx=4, HARQ_RTT=8 ms, and t_PollRetransmit=35 ms again. As shown, significantly fewer scaling factors may be valid in this scenario than if the OnDurationTimer has a length of 10 ms. 1/2 may be a valid scaling factor for all DRX cycle lengths shown except 640 ms and 320 ms, while 1/3 and 1/4 may be valid for all but 640 ms, 320 ms, and 160 ms. 1/5 may be valid only for 20 ms, and though 1/6 may be valid for 20 ms or 40 ms, 1/7 may not be a valid scaling factor for any of the DRX cycle lengths shown. 1/8 and 1/9 may also be valid only for 20 ms.

Figure 14:
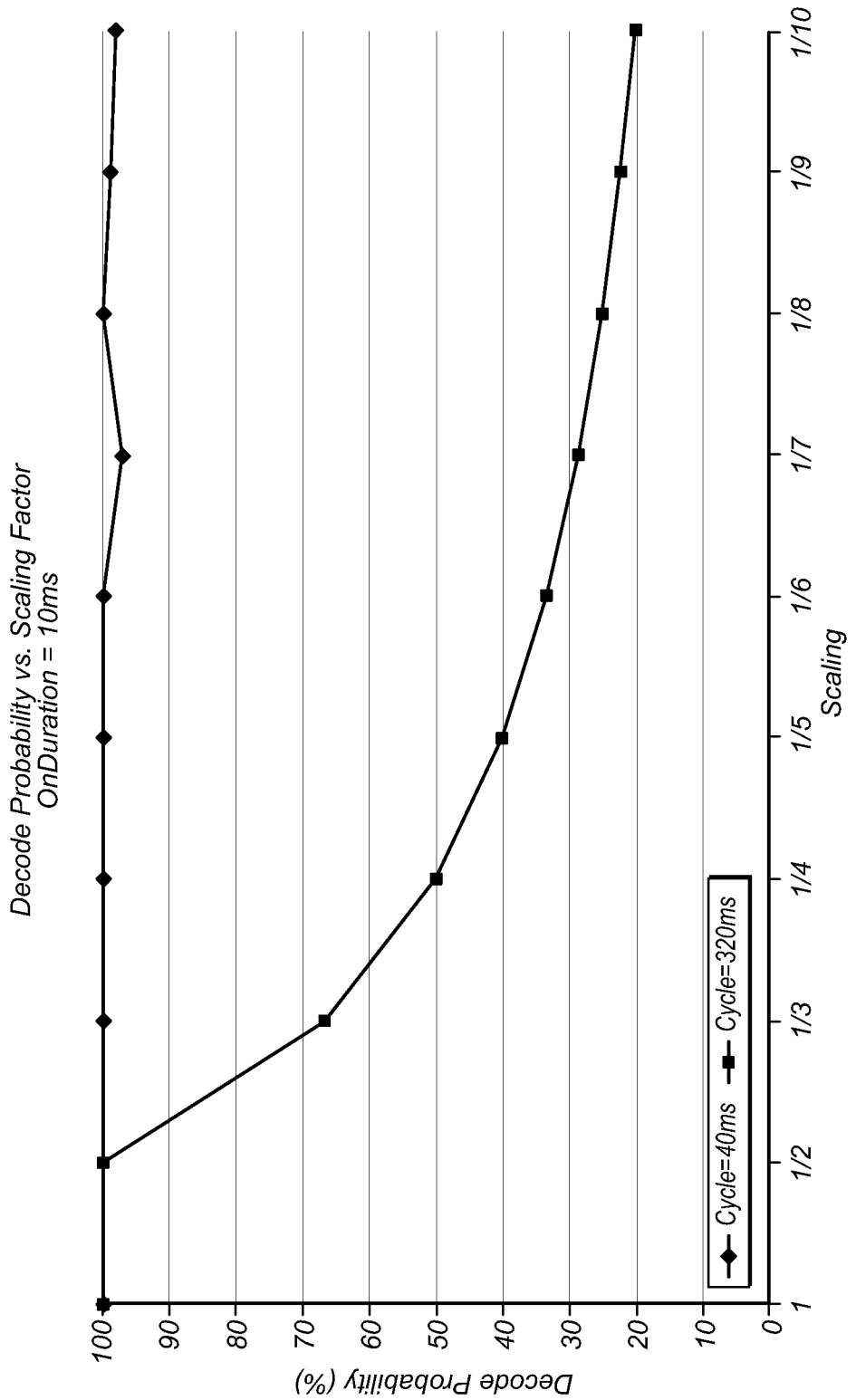

FIG. 14 illustrates a scenario in which the OnDurationTimer has a length of 10 ms, while maxReTxThreshold=16, Max_HARQ_ReTx=4, HARQ_RTT=8 ms, and t_PollRetransmit=35 ms, and in which both short and long C-DRX cycles are implemented, with shortDRXCycle=40, drxShortCycleTimer=8, and longDRXCycle=320. As shown, applicable (valid) short cycle scaling factors may include 1/2, 1/3, 1/4, 1/5, 1/6, and 1/8. The only applicable (valid) long cycle scaling factor may be 1/2. Any other scaling factors would be expected to degrade the probability of decoding any given transmission and hence introduce the potential to experience out-of-sync events and radio link failures.

Figure 15:
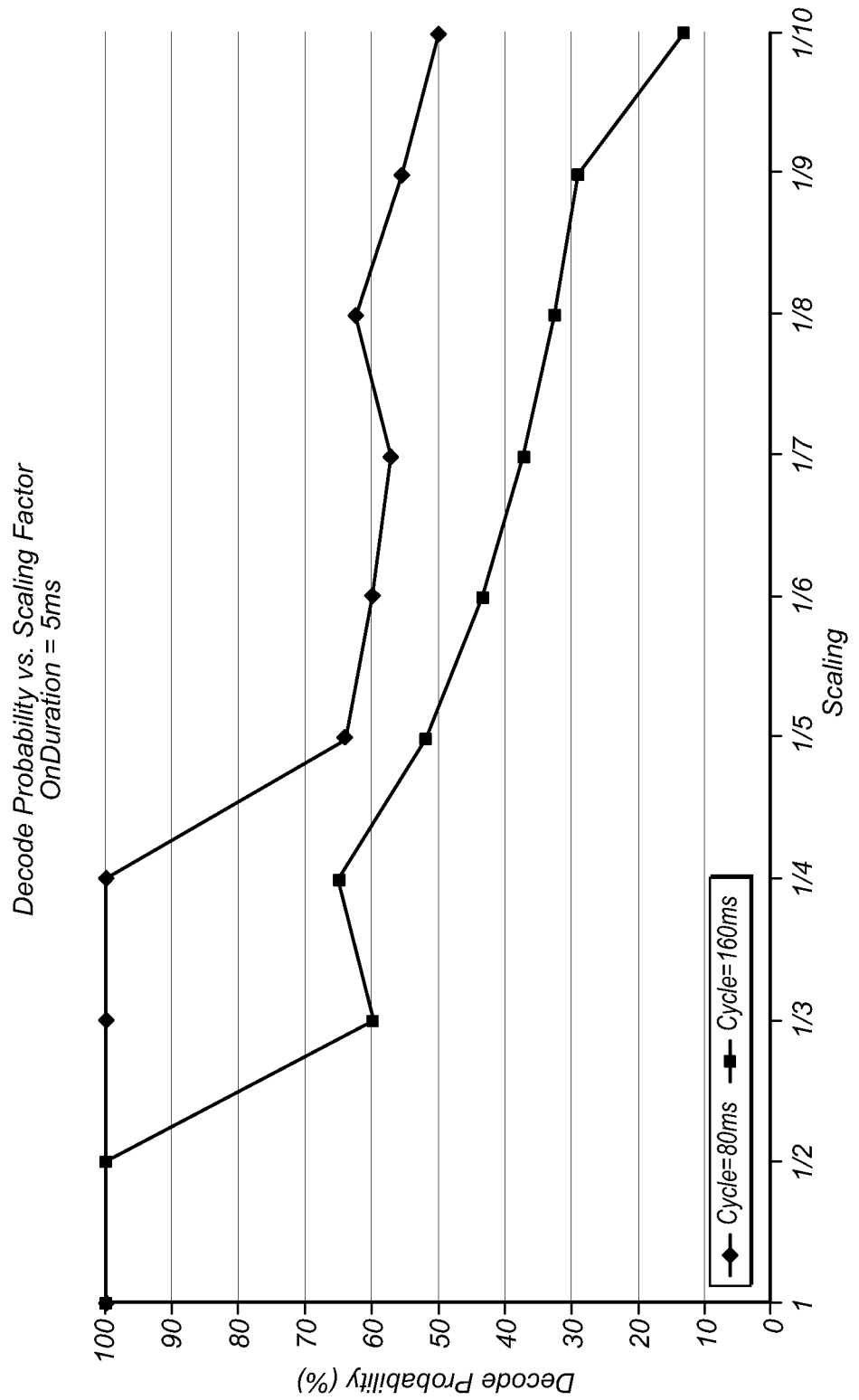

FIG. 15 illustrates a scenario in which the OnDurationTimer has a length of 5 ms, while maxReTxThreshold=16, Max_HARQ_ReTx=4, HARQ_RTT=8 ms, and t_PollRetransmit=35 ms, and in which both short and long C-DRX cycles are implemented, with shortDRXCycle=80, drxShortCycleTimer=4, and longDRXCycle=160. As shown, applicable (valid) short cycle scaling factors may include 1/2, 1/3, and 1/4. The only applicable (valid) long cycle scaling factor may be 1/2. Any other scaling factors would be expected to degrade the probability of decoding any given transmission and hence introduce the potential to experience out-of-sync events and radio link failures.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless user equipment (UE) device, the UE comprising:
   a radio, comprising one or more antennas for performing wireless communication;
   a processing element, operably coupled to the radio;
   wherein the radio and the processing element are configured to:
      establish a connection with a network via a wireless link, comprising receiving network configuration parameters for connected-mode discontinuous reception (C-DRX);
      communicate with the network via the wireless link using C-DRX over a plurality of C-DRX cycles, wherein each C-DRX cycle comprises a network-configured period of time during which the UE operates in a reduced-power state and a network-scheduled on-duration period of time;
      receive, by a baseband layer of the UE, an indication from a higher layer entity of the UE to initiate C-DRX cycle scaling, wherein the indication includes information indicating different levels of C-DRX cycle scaling;
      select, by the baseband layer of the UE, a C-DRX cycle scaling factor specifying a fraction of network-scheduled on-durations to observe based on the indication, wherein the C-DRX cycle scaling factor is selected based at least in part on the network configuration parameters for C-DRX to reduce a likelihood of radio link failure and also on information included in the indication indicating a preference for a level of the C-DRX cycle scaling; and
      remain in the reduced power state during the network-scheduled on-duration period of time of a fraction of the plurality of C-DRX cycles according to the C-DRX cycle scaling factor in response to the indication.

2. The UE of claim 1, wherein the network configuration parameters comprise one or more of:
a length of the C-DRX cycles;
a number of retransmissions provided by the network before determining that the wireless link has failed;
an amount of time between retransmissions; or
a length of the network-scheduled on-duration period of time of C-DRX cycles.

3. The UE of claim 2,
wherein the number of retransmissions provided by the network before determining that the wireless link has failed comprise hybrid automatic repeat request (HARD) retransmissions and radio link control (RLC) retransmissions.

4. The UE of claim 1, wherein the indication is based on one or more of:
battery level of the UE falling below a battery level threshold;
temperature of the UE exceeding a thermal mitigation threshold;
powering down of one or more user interface elements of the UE;
a type of traffic pattern relating to data communicated between the UE and the network; or
Quality of Service (QoS) requirements relating to data communicated between the UE and the network.

5. A method for baseband layer operation of a wireless user equipment (UE) device, the method comprising:
establishing a connection with a network via a wireless link with a first cell, wherein the wireless link and the first cell operate according to LTE, wherein establishing the connection comprises receiving one or more network parameters from the network;
receiving a command to activate discontinuous reception (DRX) cycle scaling, wherein the command includes information indicating different levels of C-DRX cycle scaling;
determining valid DRX cycle scaling factors for the network parameters received from the network based on whether or not there is a chance of radio link failure for a given scaling factor under normal reception conditions using the network parameters received from the network;
selecting a DRX cycle scaling factor from the DRX cycle scaling factors determined to be valid based on the command to activate DRX cycle scaling, wherein the selected DRX cycle scaling factor indicates how frequently to observe network-configured DRX cycle wakeup times;
activating DRX cycle scaling using the selected DRX cycle scaling factor in response to the command to activate DRX cycle scaling; and
communicating with the network using DRX, wherein DRX cycle observation by the baseband layer is scaled according to the selected DRX cycle scaling factor while communicating with the network using DRX based on the command to perform DRX cycle scaling such that baseband layer remains in a low power state during a subset of the network-configured DRX cycle wakeup times.

6. The method of claim 5,
wherein determining valid DRX cycle scaling factors comprises using an equation configured to determine whether or not there is a chance of radio link failure for a given scaling factor under normal reception conditions based on the one or more network parameters received from the network, wherein valid DRX cycle scaling factors are DRX cycle scaling factors for which there is not a chance of radio link failure for the given scaling factor under normal reception conditions.

7. The method of claim 6,
wherein the selected DRX cycle scaling factor is a valid DRX cycle scaling factor which provides a greatest amount of scaling.

8. The method of claim 5,
wherein the command is received from an application operating at an application layer of the UE.

9. The method of claim 8,
wherein the command indicates a sensitivity to delay of the application, and
wherein the selected DRX scaling factor is determined at least in part based on the sensitivity to delay of the application.

10. The method of claim 5, further comprising:
receiving a command to cease performing DRX cycle scaling,
wherein DRX cycle observation is no longer scaled while communicating with the network using DRX after receiving the command to cease performing DRX cycle scaling.

11. The method of claim 5, wherein the one or more network parameters specify one or more of:
a number of short DRX cycles to be performed;
a short DRX cycle length;
a long DRX cycle length;
a wakeup period length;
a number of HARQ retransmission attempts performed by the network;
an amount of time between HARQ retransmission attempts;
a number of RLC retransmission attempts performed by the network; or
an amount of time between RLC retransmission attempts.

12. The method of claim 5, further comprising:
receiving an indication to modify an amount of DRX cycle scaling used; and
selecting a new DRX cycle scaling factor based on the indication to modify an amount of DRX cycle scaling used.

13. The method of claim 5, further comprising:
determining that a paging opportunity is scheduled for a DRX cycle wakeup time which the UE is not scheduled to observe according to the DRX cycle scaling factor; and
observing the DRX cycle wakeup time for which the paging opportunity is scheduled based on determining that the paging opportunity is scheduled for the DRX cycle wakeup time.

14. The method of claim 5, further comprising:
determining that a Timing Advance (TA) command is expected for a DRX cycle wakeup time which the UE is not scheduled to observe according to the DRX cycle scaling factor; and
observing the DRX cycle wakeup time for which the TA command is expected based on determining that the TA command is expected for the DRX cycle wakeup time.

15. The method of claim 5,
wherein communicating with the network using DRX comprises communicating with the network using connected-mode DRX (C-DRX).

16. A non-transitory computer accessible memory medium comprising program instructions which, when executed at a baseband layer of a wireless user equipment (UE) device, cause the baseband layer to implement a method, comprising:

establishing a connection with a network via a wireless link, comprising receiving network configuration parameters for connected-mode discontinuous reception (C-DRX);

receiving a command to perform C-DRX cycle scaling, wherein the command is generated internally by the UE and includes information indicating different levels of C-DRX cycle scaling;

determining a C-DRX cycle scaling factor in response to the command to perform C-DRX cycle scaling, wherein the C-DRX cycle scaling factor comprises a ratio of observed to skipped C-DRX cycle on-durations, wherein the C-DRX cycle scaling factor is determined based at least in part on the network configuration parameters for C-DRX to reduce a likelihood of radio link failure and also on information included in the command indicating a preference for a level of the C-DRX cycle scaling; and communicating with the network using C-DRX according to the determined C-DRX cycle scaling factor, comprising observing and skipping scheduled C-DRX on-durations in proportion with the C-DRX cycle scaling factor, based on the command to perform C-DRX cycle scaling.

17. The memory medium of claim 16, wherein C-DRX cycle on-durations for which signaling transmissions are scheduled or expected are not skipped despite the command to perform C-DRX cycle scaling.

18. A wireless user equipment (UE) device, the UE comprising:

a radio, comprising one or more antennas for performing wireless communication;

a memory medium; and one or more processing elements configured to execute program instructions comprised on the memory medium;

wherein the UE is configured to:

establish a connection with a network via a wireless link;

communicate with the network using connected-mode discontinuous reception (C-DRX), wherein one or more C-DRX operation parameters are received from the network, wherein the one or more C-DRX operation parameters comprise at least a C-DRX cycle length;

determine, based on conditions internal to the UE, to implement C-DRX cycle scaling according to one of a plurality of levels of C-DRX cycle scaling, wherein C-DRX cycle scaling comprises observing a fraction of network-configured C-DRX cycle on-durations in order to effectively increase the C-DRX cycle length;

determine a C-DRX cycle scaling factor, wherein the C-DRX cycle scaling factor indicates the fraction of C-DRX cycle on-durations to observe, wherein the C-DRX cycle scaling factor is determined based at least in part on the C-DRX operation parameters to reduce a likelihood of radio link failure and also on the one of the plurality of levels of C-DRX cycle scaling; and remain in a reduced-power state during at least one scheduled C-DRX on-duration in response to determining to implement C-DRX cycle scaling and based at least in part on the determined C-DRX cycle scaling factor.

19. A method for a wireless user equipment (UE) device to increase C-DRX power savings, the method comprising:

receiving network configuration parameters for connected-mode discontinuous reception (C-DRX);

communicating with a network via a wireless link using C-DRX according to the network configuration parameters for C-DRX over a plurality of C-DRX cycles, wherein each C-DRX cycle comprises a period of time during which the UE operates in a reduced-power state and a scheduled on-duration period of time;

determining a probability that skipping the scheduled on-duration period of time of at least one C-DRX cycle would result in a radio link failure based on the network configuration parameters and on different levels of C-DRX cycle scaling;

determining to skip a scheduled on-duration period of time of the at least one C-DRX cycle based on detecting a condition internal to the UE and based on determining that the probability that skipping the scheduled on-duration period of time would result in a radio link failure based on the network configuration parameters is below a threshold; and remaining in the reduced-power state during the scheduled on-duration period of time of at least one C-DRX cycle in response to determining to skip the scheduled on-duration.

20. The method of claim 19, further comprising:

determining to skip on-durations according to a C-DRX cycle scaling ratio which indicates a fraction of C-DRX cycle on-durations for which to remain in the reduced-power state, wherein determining to skip the scheduled on-duration period of time of at least one C-DRX cycle is performed based on determining to skip on-durations according to the C-DRX cycle scaling ratio.

21. The method of claim 19, wherein determining to skip the scheduled on-duration period of time of at least one C-DRX cycle is performed in order to reduce one or more of power usage or thermal energy buildup of the UE.

* * * * *